United States Patent [19]

Larner

[11] Patent Number: 4,552,027
[45] Date of Patent: Nov. 12, 1985

[54] FLUID-FLOW TRANSDUCER

[75] Inventor: Donald A. Larner, Kingston-upon-Thames, England

[73] Assignee: Fluid Devices Ltd., England

[21] Appl. No.: 585,144

[22] Filed: Mar. 1, 1984

[30] Foreign Application Priority Data

Mar. 3, 1983 [GB] United Kingdom ............... 8305926

[51] Int. Cl.⁴ .............................................. G01F 1/26
[52] U.S. Cl. ................. 73/861.53; 73/861.55
[58] Field of Search ........... 73/861.53, 861.54, 861.55, 73/861.57, 861.58

[56] References Cited

U.S. PATENT DOCUMENTS

| | | | |
|---|---|---|---|
| 2,574,866 | 11/1951 | Fahrlander | 73/861.58 |
| 3,979,955 | 9/1976 | Schulte | 73/861.55 |
| 4,235,105 | 11/1980 | Walters | 73/861.53 |
| 4,366,718 | 1/1983 | Nelson | 73/861.58 |
| 4,368,646 | 1/1983 | Rogg . | |

Primary Examiner—Herbert Goldstein
Attorney, Agent, or Firm—Ostrolenk, Faber, Gerb & Soffen

[57] ABSTRACT

A high pressure hydraulic fluid-flow transducer 10 has a frusto-conical throat 13 obturated by a valve member 14 which is fixed to a spindle 16 slidingly carried in a bearing 17 which is fixed to the one-piece housing 11. The bearing 17 engages a substantial length of the spindle, to prevent wobbling, closely adjacent the smaller throat end 15. The housing 11 has internal screw-threads 21, 22 at both ends, for connecting the sensor into an hydraulic system. Because the compression spring 18 is upstream of the valve member 14, and acts upon the upstream end 25 of spindle 16, the valve member 14 and throat 13 are both readily accessible through the downstream end of the housing, both for inspection purposes and for machining of the throat before insertion of the valve member and spindle. Reverse fluid flow is possible by virtue of a second spring 29, acting between valve member 14 and spindle 16.

10 Claims, 5 Drawing Figures

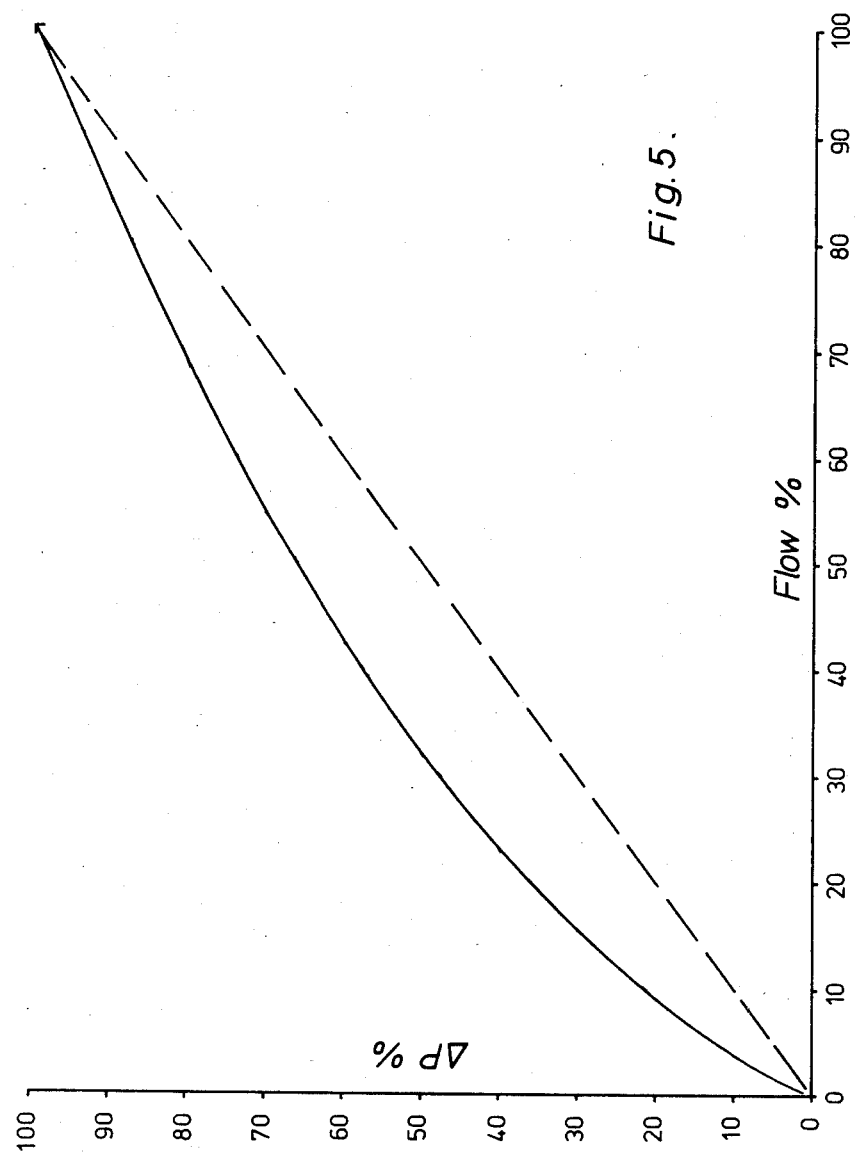

FLUID-FLOW TRANSDUCER

BACKGROUND OF THE INVENTION

1. Field of the Invention

This invention relates to a fluid-flow transducer for producing a pressure differential responsive to rate of at least normally unidirectional fluid flow.

More particularly, this invention relates to a fluid-flow transducer of a type for producing a pressure differential responsive to rate of at least normally unidirectional fluid flow, comprising: a housing forming a flow passage for the fluid; said passage having formed therein a throat which diverges progressively in the normally downstream direction; a valve member adapted and arranged for obturating the smaller end of the throat when there is no flow or very little flow; the valve member being carried by a spindle which extends in the normally upstream direction from the throat and is slidably supported by a bearing upstream of but adjacent the throat, the bearing being fixed to the housing; and an axially extending compression coil spring for biasing the valve member in the upstream direction relative to the housing to tend to close the throat; the housing having two ports therein, respectively upstream and downstream of the throat, for detection of a pressure differential induced across the throat by a fluid flow.

2. Description of the Prior Art

British Patent Specification No. 1 490 989 discloses such a fluid-flow transducer in FIG. 1 of the drawings of British Patent Specification No. 1 490 989. However, this transducer exhibits a number of defects or disadvantages. Firstly, the "housing" is a pipe-line with (presumably) its upstream and downstream ends remote from the throat 25, so it is not clear how the throat would be fabricated, particularly since the throat is not a simple frusto-conical throat but has a complex curvature. Secondly, the compression spring which biases the valve member in the upstream direction is located downstream of the valve member itself and it is not clear how the downstream end of the compression spring would be supported, other than by a support (not disclosed) having the effect of severely restricting the flow passage. Thirdly, the bearing only engages a relatively short axial length of the spindle, which is therefore liable to wobble. This liability to wobble is especially disadvantageous for very small rates of flow when the valve member is obturating, or almost obturating, the smaller end of the throat, since it will result in relatively large variation in the gap between the valve member and the smaller end of the throat through which the fluid flows, with consequential variation in the pressure differential produced by the fluid flow, when the rate of flow is very small.

Furthermore, British Patent Specification No. 1 490 989 does not suggests how accurate concentricity is to be achieved between the valve member and the smaller end of the throat.

In FIG. 3 of British Patent Specification No. 1 490 989, there is proposed a bi-directional construction, to permit reverse fluid flow. However, the proposed construction is impractical for a number of reasons. Firstly, the bearing is spaced upstream of the smaller end of the throat, so that there is a large overhang of the spindle, with consequential inaccurate location of the valve member at the place where it is required to be most accurately located, namely, at the narrowest part of the throat (either throat, that is). Secondly, there is no suggestion as to how to adjust the initial or zero flow position of the valve member, and no obvious way of doing so.

Other, less relevant, prior art includes British Patent Specification Nos. 1 190 912 and 1 566 251 (both Gervase Instruments Limited) and U.S. Pat. No. 3 554 031 (D. Turner).

SUMMARY OF THE INVENTION

A preferred application of the present invention is to a fluid-flow transducer adapted for incorporation into a high pressure hydraulic system.

It is believed possible by means of the present invention to provide a fluid-flow transducer for producing a pressure differential responsive to rate of at least normally unidirectional hydraulic fluid flow, in an hydraulic system, with a very wide range of rate of flow at reasonable cost.

According to the present invention there is provided a fluid-flow transducer for producing a pressure differential responsive to rate of at least normally unidirectional fluid flow, comprising: a housing forming a flow passage for the fluid; said passage having formed therein a throat which diverges progressively in the normally downstream direction; a valve member adapted and arranged for obturating the smaller end of the throat when there is no flow or very little flow; the valve member being carried by a spindle which extends in the normally upstream direction from the throat and is slidably supported by a bearing upstream of but adjacent the throat, the bearing being supported relative to the housing by a bearing support; and an axially extending compression coil spring for biasing the valve member in the upstream direction relative to the housing to tend to close the throat; the housing having two ports therein, respectively upstream and downstream of the throat, for detection of a pressure differential induced across the throat by a fluid flow; characterised in that the housing is adapted for incorporation into a fluid flow system by having connecting means at an upstream end and a downstream end of the housing; in that the spring is arranged upstream of the valve member and acts upon an upstream end of the spindle; in that there is substantially unobstructed access through the downstream end of the housing to the throat and to the valve member; and in that the bearing engages a substantial length of the spindle closely adjacent the smaller end of the throat for very accurately aligning the valve member, particularly when the valve member is almost closing the throat.

Preferably the housing is made in one piece, in order to avoid possible leakage problems and structural weakness if the housing were made in two or more pieces.

Preferably, the connecting means at the upstream and downstream ends of the housing are internal screw-threads. If these screw-threads are of a standard size, having regard to the fluid flow system into which the housing is to be incorporated, making them internal screw threads (as opposed to external screw-threads) maximises the accessibility of the interior of the housing.

Preferably the throat is substantially frusto-conical. This provides a relatively wide variation of pressure differential for a relatively small variation in rate of fluid flow at very low rates of fluid flow, with relatively less variation in pressure differential at higher rates of flow. If it is desired to convert the differential pressure into a proportional electrical signal to transmit the information over a distance, or to drive digital type displays or input data to computer and the like, a programmed-read-only-memory ("PROM") type processor may be used to convert the curve into a straight line, so to speak.

Preferably the valve member is substantially frusto-conical, tapering in the normally downstream direction. This is of particular advantage if the transducer incorporates a second spring (see below) acting between the valve member and the spindle, to permit reverse fluid flow.

Preferably the bearing support extends substantially radially inwardly from only one side of the housing.

Preferably the housing provides an enlargement of the flow passage substantially immediately upstream of the smaller end of the throat, and the valve member is movable in the upstream direction from the smaller end of the throat into said enlargement, against a preloaded bias of a second spring (see above) acting between the valve member and the spindle, to permit reverse fluid flow. If the valve member is substantially frusto-conical, tapering in the normally downstream direction, it can accommodate this second spring at least when the second spring is fully compressed.

A preferred method of making the above-described fluid flow transducer includes the steps of: (a) assembling and fixing together the housing and the bearing and the bearing support to form one sub-assembly; (b) at least partly finish-machining the throat and the bearing; (c) assembling together the valve member and the spindle to form another sub-assembly; and (d) at least partly finish-machining the valve member and the spindle; characterised in that step (b) follows step (a), to achieve accurate mutual concentricity between the throat and the bearing, and in that step (d) follows step (c), to achieve accurate mutual concentricity between the valve member and the spindle.

BRIEF DESCRIPTION OF THE DRAWINGS

FIG. 5 is a graph illustrating percentage variation of presssure differential against percentage variation in rate of fluid-flow.

DESCRIPTION OF PREFERRED EMBODIMENT

Figure 1:
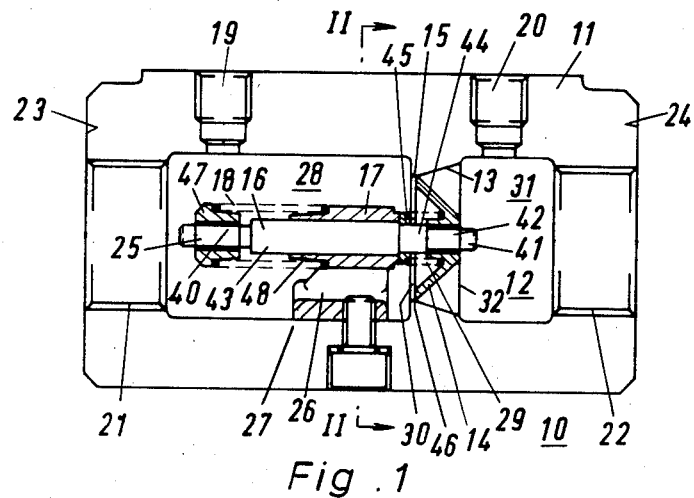
FIG. 1 is a view of a longitudinal section through a fluid-flow transducer embodying the invention.
Figure 2:
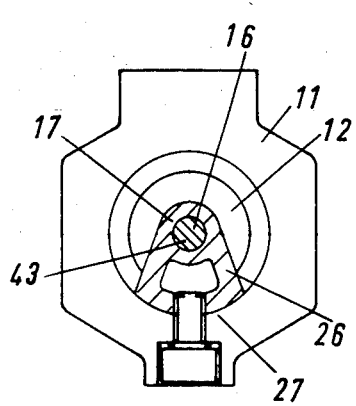
FIG. 2 is a view of a section along a plane indicated by line II—II of FIG. 1.

Referring to the drawings, the illustrated fluid flow transducer 10, for producing a pressure differential responsive to rate of at least normally unidirectional fluid flow, comprises: a one-piece housing 11 forming a flow passage 12 for the fluid; the passage 12 having formed therein a throat 13 which diverges progressively in the normally downstream direction (that is, from left to right in FIG. 1). A valve member 14 is adapted and arranged for obturating the smaller end 15 of the throat 13 when there is no flow or very little flow; the valve member 14 being carried by (and fixed to) a spindle 16 which extends in the normally upstream direction from the throat 13 and is slidably supported by a bearing 17 upstream of but adjacent the throat 13, the bearing 17 being fixedly supported relative to the housing 11 by an integral bearing support 26. A first axially extending compression coil spring 18 biases the valve member 14 in the upstream direction, relative to the housing 11, to tend to close the throat 13. The housing 11 has two ports 19 and 20 therein, respectively upstream and downstream of the throat 13, for detection of a pressure differential induced across the throat 13 by fluid flow.

The housing 11 is adapted for incorporation into a fluid flow system (not shown) preferably a high pressure hydraulic system, by having connecting means in the form of internal screw-threads 21, 22 at an upstream end 23 and a downstream end 24 respectively of the housing 11. As shown in FIG. 1, the first spring 18 is arranged upstream of the valve member 14 and acts upon an upstream end (portion) 25 of the spindle 16.

Figure 3:
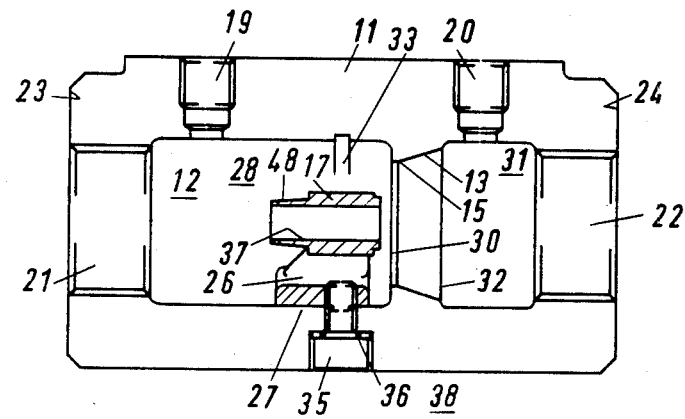
FIG. 3 is a view corresponding to FIG. 1 of a sub-assembly of the housing, the bearing and the bearing support.

As shown clearly in FIGS. 1 and 3, there is substantially unobstructed access through the downstream end 24 of the housing 11 to the throat 13 and to the valve member 14. Furthermore, the bearing 17 engages a substantial length of the spindle 16 closely adjacent the smaller end 15 of the throat 13, for very accurately aligning the valve member 14, particularly when the valve member 14 is almost closing the throat 13, that is to say the smaller end 15 of throat 13.

As shown in FIGS. 1 and 3, the throat 13 is substantially frusto-conical, diverging (as mentioned above) in the normally downstream direction.

The valve member 14 is substantially frusto-conical, tapering in the normally downstream direction. The bearing support 26 extends substantially radially inwardly from only one side 27 of the housing 11.

The housing 11 provides an enlargement 28 of the flow passage 12, substantially immediately upstream of the smaller end 15 of the throat 13. The valve member 14 is movable in the upstream direction (from right to left in FIG. 1) from the smaller end 15 of the throat 13 into the enlargement 28, against a preloaded bias of a second spring 29 acting between the valve member 14 and the spindle 16, to permit reverse fluid flow. Because the valve member 14 is substantially frusto-conical, tapering in the normally downstream direction, it can accommodate the second spring 29 at least when spring 29 is fully compressed.

Referring more particularly to FIG. 3, there is a relatively short parallel-sided portion 30 of the flow passage 12, interconnecting the smaller end 15 of throat 13 with the enlargement 28. The upstream port 19 opens into the enlargement 28, whilst the downstream port 20 opens into another enlargement 31 which is intermediate the downstream end of throat 13 and the downstream end screw-threads 22.

The enlargement 28 of housing 11 is provided with an annular or part-annular groove 33 which keys with a part-annular rib of the arm or pedestal 26, to prevent the latter from twisting relative to the housing 11. A headed screw 35 is screwed into a screw-threaded aperture in bearing support 26 as shown, and an industrial anaerobic adhesive is used to fix them permanently together, so that the bearing support 26 becomes immovable relative to housing 11. A so-called "Dowty seal" 36 (consisting of a inner rectangular sectioned rubber ring bonded to an outer metal washer) is provided between the head of the screw 35 and an annular shoulder of the housing 11, to provide a fluid-tight seal in a manner well-known.

For purposes of assembly, it is quite easy to introduce the bearing 17 and its integral support 26 into the enlargement 28 through the upstream screw-threaded portion 22.

To ensure accurate mutual concentricity, it is only after the bearing support 26 has been secured immovably to the housing 11, as described above, that the throat 13, parallel-sided portion 30 and the inside surface 37 of the bearing 17 are all finish-machined at a single setting of the finishing machine. By "single setting" is meant that the sub-assembly 38, consisting of the housing 11, bearing 17 and support 26, assembled and fixed together, is set up in the finishing machine and then the machining of the throat 13, the parallel-sided portion 30 and the inside bearing surface 37 is all carried out without adjusting the position of the sub-assembly relative to the generating axis of the finishing machine.

Figure 4:
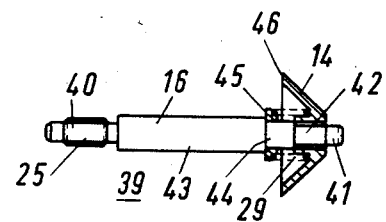
FIG. 4 is a view corresponding to FIG. 1 of another sub-assembly, namely, of the valve member and the spindle (and second spring)

Referring to FIG. 4, a second sub-assembly 39 is formed by, inter alia, the valve member 14 and spindle 16. More particularly, the spindle 16 is formed with a screw-thread 40 adjacent its upstream end 25 and another screw-thread 42 adjacent its downstream end 41. The downstream end screw-thread 42 is spaced from a main portion 43 of spindle 16 by a reduced diameter portion 44. The valve member 14 is permanently screwed and bonded (for example by means of an industrial anaerobic adhesive) to the screw-thread 42, after previous installation of a stepped spring rest 45, which can slide freely on spindle 16 within the confines of the portion 44, and the second spring 29, which is preloaded and acts between the valve member 14 and the spring rest 45.

The sub-assembly 39 is partly finish-machined at a single setting, after the valve member 14 has been bonded to the spindle 16, so that accurate concentricity is achieved between the surface of the main portion 43 of spindle 16 (which is to slidingly engage the inside surface 37 of bearing 17) and the outer rim 46 of valve member 14 (which is to engage the smaller end 15 of throat 13 and the parallel-sided portion 30 of passage 12).

After the finish-machining of sub-assembly 39, and its location in bearing 17, the first spring 18 is fitted to the spindle 16 and an adjustable spring rest 47 is screwed on to the upstream end screw-thread 40 of spindle 16, so that the first spring 18 acts between the spring rest 47 (and hence on the upstream end 25 of spindle 16) and a shoulder formed by a trepanned projection 48 of the bearing 17.

The stepped spring rest 45, which can slide freely within the confines of the portion 44, as already mentioned, is normally positioned by its engagement with a shoulder formed on the spindle 16 between the main portion 43 and the portion 44 of spindle 16.

In use, the spring rest 47 is adjusted so that the first spring 18 is in contact with, but not compressed between, the bearing 17 (or, rather, the shoulder formed by the trepanned projection 48 thereof) and the spring rest 47 itself, so that the relatively sharp outer rim 46 of valve member 14 is located axially at the plane of transition between the smaller end 15 of throat 13 and the parallel-sided portion 30 of passage 12. Because of the extreme directness and rigidity of mutual location of the valve member 14 and the throat 13, the initial diametral clearance between these features can be exceedingly small.

As fluid flow increases through the flow passage 12 from the inlet at the upstream end 23 to the outlet at the downstream end 24 of housing 11, the valve member 14 moves progressively downstream (to the right in FIG. 1) presenting an increasing annular orifice area between its outer rim 46 and the profiled wall of the throat 13, at the same time compressing the first spring 18. A varying differential pressure is thus induced across the throat 13 according to the rate of the first spring 18 and the predetermined profile of the throat 13. This differential pressure can be detected by tappings at the upstream port 19 and downstream port 20.

For example, a suitable differential pressure gauge for connection to the ports 19 and 20 is disclosed in our co-pending application No. 585,143; filed 3/1/84.

Typically, if for example the outer rim 46 of valve member 14 and the smaller end 15 of the throat 13 and the parallel-sided portion 30 of passage 12 are nominally of 21 millimeters ("mm") diameter, the minimum diametral clearance between the outer rim 46 on the one hand and the smaller throat end 15 and passage portion 30 on the other hand may be as small as 0.02 mm without incurring excessive manufacturing cost. In normal hydraulic service, for example, this will enable a measuring range of 200:1 to be accomplished quite easily and economically.

In the event that reverse fluid flow takes place in the flow passage 12 (from the normally downstream end 24 to the normally upstream end 23 of housing 11) the secondary spring 29 yields once the reverse pressure has built up to overcome the preloading of spring 29. This has two principal effects, one being that a significant differential pressure signal (for example, one pound/square inch or 0.07 bar) of reverse polarity appears at ports 19 and 20, to indicate that reverse flow is occurring, even for an extremely small rate of reverse flow, the other effect being that, once the reverse differential pressure has built up sufficiently to overcome the preloading of spring 29, the outer rim 46 of valve member 14 is able to move out of passage portion 30, abruptly into the passage enlargement 28, thus permitting the relatively easy passage of larger reverse flows without damage to any of the components of the transducer 10 (or the differential pressure gauge if connected thereto) or loss of calibration accuracy. On cessation of reverse flow, the valve member 14 resets to its normal initial position, substantially obturating the smaller throat end 15, under the influence of the secondary spring 29 acting between the valve member 14 and the stepped spring rest 45.

In a possible modification, the screw-threads 21 and 22 at the upstream and downstream ends 23 and 24 of housing 11 may be replaced by flanges (not shown) for purposes of connecting the transducer into a hydraulic system.

FIG. 5 illustrates the relatively wide variation of pressure differential for a relatively small variation in rate of fluid flow at very low rates of fluid flow, with relatively less variation in pressure differential for the same variation in rate of fluid flow at higher rates of flow, characteristic of the frusto-conical shape of the throat 13.

I claim:

1. A fluid-flow transducer for producing a pressure differential responsive to rate of at least normally unidirectional fluid flow, comprising: a housing forming a flow passage for the fluid; said passage having formed therein a throat which diverges progressively in the normally downstream direction; a valve member adapted and arranged for obturating the smaller end of the throat when there is no flow or very little flow; the valve member being carried by a spindle which extends in the normally upstream direction from the throat and is slidably supported by a bearing upstream of but adjacent the throat, the bearing being fixedly supported relative to the housing by a bearing support; and an axially extending compression coil spring for biasing the valve member in the upstream direction relative to the housing to tend to close the throat; the housing having two ports therein, respectively upstream and downstream of the throat, for detection of a pressure differential induced across the throat by fluid flow; characterized in that the housing is adapted for incorporation into a fluid flow system by having connecting means at an upstream end and a downstream end of the housing; in that the spring is arranged upstream of the valve member and acts upon an upstream end of the spindle; in that there is substantially unobstructed access through the downstream end of the housing to the throat and to the valve member; and in that the bearing engages a substantial length of the spindle closely adjacent the smaller end of the throat for very accurately aligning the valve member, particularly when the valve member is almost closing the throat.

2. A fluid flow transducer according to claim 1 wherein the housing is made in one piece.

3. A fluid flow transducer according to claim 1 characterised in that the connecting means at the upstream and downstream ends of the housing are internal screw-threads.

4. A fluid flow transducer according to claim 1 characterised in that the throat is substantially frusto-conical.

5. A fluid flow transducer according to claim 1 characterised in that the valve member is substantially frusto-conical tapering in the normally downstream direction.

6. A fluid flow transducer according to claim 1 characterized in that the bearing support extends substantially radially inwardly from only one side of the housing.

7. A fluid flow transducer according to claim 1 characterised in that the housing provides an enlargement of the flow passage substantially immediately upstream of the smaller end of the throat, and in that the valve member is movable in the upstream direction from the smaller end of the throat into said enlargement, against a preloaded bias of a second spring acting between the valve member and the spindle, to permit reverse fluid flow.

8. A fluid flow transducer according to claim 7 wherein the valve member can accommodate the second spring at least when the second spring is fully compressed.

9. A method of making a fluid flow transducer according to claim 1, including the steps of: (a) assembling and fixing together the housing and the bearing and the bearing support to form one sub-assembly; (b) at least partly finish-machining the throat and the bearing; (c) assembling together the valve member and the spindle to form another sub-assembly; and (d) at least partly finish-machining the valve member and the spindle; characterised in that step (b) follows step (a), to achieve accurate mutual concentricity between the throat and the bearing, and in that step (d) follows step (c), to achieve accurate mutual concentricity between the valve member and the spindle.

10. A fluid flow transducer according to claim 1 wherein the housing is made in one piece;
   characterised in that the connecting means at the upstream and downstream ends of the housing are internal screw-threads;
   characterised in that the throat is substantially frusto-conical;
   characterised in that the valve member is substantially frusto-conical tapering in the normally downstream direction;
   characterised in that the bearing support extends substantially radially inwardly from only one side of the housing;
   characterised in that the housing provides an enlargement of the flow passage substantially immediately upstream of the smaller end of the throat, and in that the valve member is movable in the upstream direction from the smaller end of the throat into said enlargement, against a preloaded bias of a second spring acting between the valve member and the spindle, to permit reverse fluid flow; and
   wherein the valve member can accommodate the second spring at least when the second spring is fully compressed.

* * * * *